United States Patent [19]
Oldford

[11] 4,016,991
[45] Apr. 12, 1977

[54] RAILWAY LOADING AND UNLOADING SYSTEM

[76] Inventor: William G. Oldford, 4944 Lakeshore, Lexington, Mich. 48450

[22] Filed: Nov. 18, 1975

[21] Appl. No.: 633,109

Related U.S. Application Data

[63] Continuation of Ser. No. 459,478, April 10, 1974, abandoned.

[52] U.S. Cl. .............................. 214/38 C; 14/71.1; 105/238 R; 105/436; 214/85; 254/5 C
[51] Int. Cl.² ........................................ B65G 67/02
[58] Field of Search ........ 214/38 B, 38 BA, 38 BB, 214/38 C, 38 CC, 38 D, 85, 516, 517, ; 105/238 R, 366 R, 378, 436; 14/71, 72; 254/5 C

[56] References Cited

UNITED STATES PATENTS

| | | | |
|---|---|---|---|
| 1,965,387 | 7/1934 | McDonald | 14/71 |
| 2,123,505 | 7/1938 | Faries | 214/38 C X |
| 2,190,708 | 2/1940 | Fowler | 105/238 R |
| 2,370,427 | 2/1945 | Sherry | 214/85 |
| 2,828,027 | 3/1958 | Stevenson et al. | 214/38 C |
| 3,563,400 | 2/1971 | Greaves | 214/16.11 CC |
| 3,610,580 | 10/1971 | Johnstone | 214/38 CC X |
| 3,687,186 | 8/1972 | Paton | 105/378 X |
| 3,715,043 | 2/1973 | Weir | 214/38 B |
| 3,788,500 | 1/1974 | Lemelson | 214/41 |

*Primary Examiner*—Robert G. Sheridan
*Attorney, Agent, or Firm*—Harness, Dickey & Pierce

[57] ABSTRACT

A system is provided embodying a platform spaced on runners which is movable into and from a railway car having one entire side open when the hinged side is raised. This produces the most economical use of a closed car as it can be moved to an unloading dock where the mechanism of the system is advanced beneath the platform within the car and raised to free the platform from the floor so that it and its load may be withdrawn. The car is then advanced to a loading dock where a similar mechanism is employed having the platform loaded so that it and the platform can be advanced into the car and lowered onto the floor permitting the mechanism to be withdrawn and the side of the car closed and latched.

5 Claims, 6 Drawing Figures

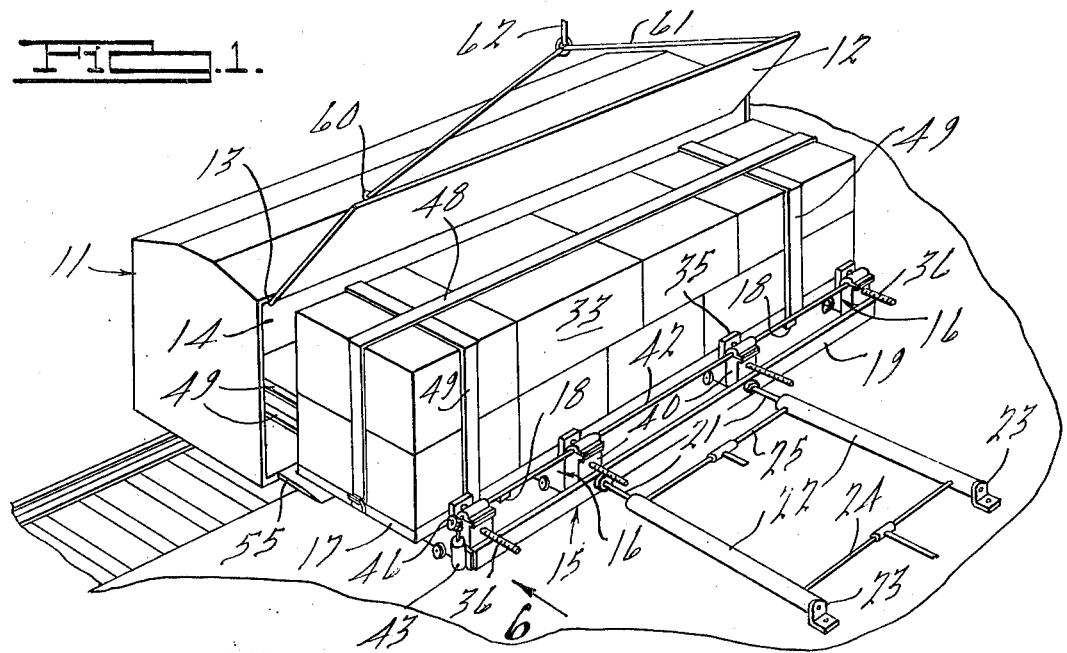

RAILWAY LOADING AND UNLOADING SYSTEM

This is a continuation of application Ser. No. 459,478, filed Apr. 10, 1974 now abandoned.

BACKGROUND OF THE INVENTION

A search of the art uncovered the following patents relative to the present invention:

| | |
|---|---|
| 1,793,332 | 3,180,281 |
| 2,083,178 | 3,616,957 - Cl 220 - 1.5 |
| 2,190,708 | 3,752,085 - Cl 105 - 368R |

SUMMARY OF THE INVENTION

The present system is employed with a railway box car having an entire side hinged along an edge so that it can be raised if hinged at the top and lowered if hinged at the bottom, to open the entire side of the car. In the structure herein illustrated, the side is hinged at the top and provided with eyes at the bottom corners to which a cable may be attached which is raised to swing the side upwardly to expose the side opening. At the unloading dock a plurality of spaced carriers are provided having wheels on which they are advanced as a unit from the dock onto the floor of the car beneath a platform on which the transported merchandise is supported. The carriers have mechanism by which the upper portion is raised to lift the runners of the platform from the car floor so that a pair of rams can withdraw the carriers, platform and merchandise from within the car onto the unloading dock. The empty car may then be advanced to a loading dock where like carriers support a platform between the spaced runners and on which the merchandise to be shipped is supported. Rams advance the carriers and platform into the car where the upper portion of the carriers is lowered, moving the platform downwardly onto its runners which frees the carriers so that they may be withdrawn from the car onto the loading dock. Thereafter, the bridging unit between the car and dock is removed, the side is lowered to closed position and latched into place with the merchandise firmly anchored to the platform. The platform rests upon the floor of the car with the runners adjacent to braces which secure the platform against endwise movement. The merchandise will not move lengthwise of the car against the ends thereof if secured to the platform.

BRIEF DESCRIPTION OF THE DRAWING

FIG. 1 is a perspective view of a car along with the loading mechanism which is movable into and from a car which embodies features of the present invention;

FIG. 2 is a broken side view of an end portion of a carrier illustrated in the structure of FIG. 1;

FIG. 3 is a sectional view of the structure illustrated in FIG. 2, taken on the line 3-3 thereof;

FIG. 4 is a broken bottom view of the side of the car in closed, latched position;

FIG. 5 is a view of the car and loading dock having a bridging member thereacross which permits the carriers to move from and onto the car floor, and FIG. 6 is a view of the structure illustrated in FIG. 1, as viewed from the point 6 thereof.

DESCRIPTION OF THE PREFERRED EMBODIMENT

A railroad car 11 has an entire side 12 hinged along the top edge at 13 which forms an opening 14 the entire vertical and horizontal dimensions of the car when in raised position. The loading and unloading mechanism 15 of the system permits the unloading of the car at an unloading dock in a minimum of time and when advanced to a shipping dock is loaded in a reverse manner with an expenditure of a minimum of time. This permits the closed car to be in service the greater part of the time, thus, providing the greatest amount of economy in its use.

The mechanism of the system embodies a plurality of spaced carriers 16 which support a platform 17 having spaced runners 18 transversely disposed on the bottom thereof. The carriers are connected together at the front by a cross member 19 to which piston rods 21 of spaced rams 22 are secured. The rear end of the cylinders of the rams have flanged heads 23 which are rigidly secured to the dock. A fluid conduit system 24 directs oil or other fluid to the rear end of the cylinders 22 for advancing the piston rods and the carriers forwardly into the car. A similar fluid system 25 is connected to the forward end of the cylinders 22 to direct oil or other fluid into the forward end of the cylinders for retracting the piston rods 21 thereinto for withdrawing the carriers 16 from the car.

Each of the carriers 16, as illustrated in FIGS. 2 and 3, embodies a channel shaped base element 26 and a downwardly presented channel element 27 disposed thereabove which has grooved wheels 28 pivoted thereto and mounted on shafts 29 which extends through the side walls of the channel element 27. The side flanges 31 of the channel base element 26 has sloping edges 32 down and up which the wheels 28 travel when the downwardly presented channel element 27 is moved longitudinally. When the channel element 27 is in raised position, it supports the platform 17 on which a load of merchandise 33 of various kinds is supported. The base channel element 26 has a plurality of wheels 34 thereon by which the plurality of carriers 16 and the platform 17 is moved into and out of the car.

The downwardly presented channel element 27 has an upright section 35 at the front end which has a threaded shaft 36 secured thereto between bosses 37 and thrust washers 38.

The threaded shaft 36 has a square portion 30 which is movable upwardly and downwardly in a slot 20 in the section 35. A threaded worm wheel 39 is supported within the upright element 40 and is driven by a worm 41 on a shaft 42 which interconnects all of the worms 41 of the carriers. A motor 43 is mounted on the endmost carriage 16 having its shaft 44 provided with a worm 45 which drives a worm wheel 46 securing the shaft 42 for operating all of the threaded shafts 36 simultaneously. This advances all of the downwardly presented channels 27 of the carriers 19 longitudinally toward the car to have the wheels travel down the ramps 32 to thereby lower the downwardly presented channels 27 and the platform 33. This downward movement disposes the runners 18 under the platform onto the floor of the car and frees the carriers 16 so that they may be withdrawn therefrom.

When the car is advanced to an unloading dock, when arriving at its destination, the lowered carriers are advanced into the car beneath the platform, the motor 43 is reversed to move the downward presented channel elements 27, away from the car, to have the wheels 28 climb up the ramps 32 thereby engaging the underface of the platform 33 and raising the runners 13 from the floor to permit the platform and the load thereon to be moved from the car onto the dock by the retraction of the piston rods 21.

The side 12 of the car is then lowered and locked in closed position and the car is moved along the track to a loading dock where the eyes 60 at the bottom corners of the side 12 are engaged by the hooks on the ends of a cable 61 supported on the raisable cable 62. In this manner the side can again be raised to permit the movement of the platform and load into the car as above described. Straps 48 may be secured over the merchandise for maintaining the load fixed to the platform to prevent the load from shifting any substantial amount when the car is moved to different locations. Similarly, one or a pair of spaced securing strips 49 may receive a runner 18 therebetween, or be located on opposite sides of spaced runners to prevent the platform from moving lengthwise relative to the car floor.

When the side 12 is lowered, as illustrated in FIG. 4, a plurality of U-shaped securing elements 51 are provided adjacent to the floor for receiving an end 52 of locking bars 53 which are guided vertically in spaced U-shaped elements 54. The U-shaped elements 51 are used for supporting a bridging member 55 between the side edge of the car floor and the loading or unloading dock 56, as illustrated in FIG. 5. Downwardly disposed fingers 57 extend through the U-shaped elements 51 to rest upon a supporting bar 58 which is secured to the car side below the elements 51 so that substantial support will be provided along the side of the car for the bridging member 55 for withstanding the load of the mechanism, merchandise and platform at the loading and unloading docks.

While ramps 32 are shown for producing the raising or lowering of the downwardly presented channel element 27, it is to be understood that pistons could be provided on the base element 26 and cylinders drilled into a solid element 27 for receiving the pistons which are sealed thereto by O-rings and which are connected to a fluid system for delivering oil or other fluid to the area above the pistons for raising the top portion of the carriers or to lower them as the case may be, for raising or lowering the loading platform. Other changes can be made in the mechanism, the one herein illustrated is satisfactory for both loading and unloading a car by advancing a platform loaded with merchandise into the side opening of the car when the side is raised and the car is located at a loading dock or to remove the platform and load when the car is located at an unloading dock. The car is economically employed when located at a loading or unloading dock for a very short time so that most of the time the car will be traveling between points of destination.

I claim:

1. In a loading and unloading mechanism for a transporting unit, a platform on which a load is assembled, carriers for supporting said platform, said carriers having upper and lower portions, wheels on said carriers by which they are advanced and retracted, means for connecting said carriers so as to have them operate as a unit, spaced runners on the bottom of the platform on which the platform rests when the carriers therebetween are removed, ramp means between said portions for raising and lowering the height of the carriers upper portions for moving the platform from and onto the runners, means for advancing and retracting said carriers to and from the railway car; U-shaped securing means for latching fingers are provided at the bottom of the side opening of the transporting unit adjacent to the floor, and a bridging member having spaced projecting fingers on one edge for engaging said securing means with the other edge resting on the dock for bridging the space therebetween.

2. In a loading and unloading mechanism for a transporting unit, a supporting area, a platform with spaced runners at the bottom forming a plurality of openings for carriers, said platform when loaded forming a complete assembly, a plurality of spaced carriers one for each said opening for supporting said assembly, wheels on said carriers on which they are advanced and retracted with and without said assembly thereon, means for connecting said carriers in a substantially parallel side by side spaced apart relationship to form a unit with the carriers aligned with said openings, means for simultaneously raising and lowering the height of all of said carriers for raising the platform and runners and for lowering the platform and runners, means for advancing said carriers into a transporting unit for moving a complete assembly transversely of its length thereinto to fill the useable area thereof, means for withdrawing them from beneath said assembly for locating it within the transporting unit, said advancing and retracting means being ram means secured to said carrier connecting means and to said supporting area for advancing and retracting said carriers, the surface of said supporting area being directly engaged by said carrier wheels.

3. In a loading and unloading mechanism for a transporting unit as recited in claim 2, wherein said transporting unit has an opening of a length larger than the length of said platform which can be advanced thereinto when moved in a direction transversely of its length.

4. In a loading and unloading mechanism for a transporting unit as recited in claim 2, wherein motor driven gear means raises said assembly when located on said area, means for actuating said ram means and advancing said assembly and carriers into said unit, means for lowering said assembly to have it rest upon said platform runners, and means for reversing said ram means for withdrawing said carriers from said unit.

5. In a loading and unloading mechanism for a transporting unit as recited in claim 2, wherein means are provided for energizing the ram means for advancing the carriers into the unit in the openings between said runners, motor actuated gear means for raising said carriers, platform and runners, and means for energizing said ram means for withdrawing the carriers and the assembly from said unit.

* * * * *